(12) United States Patent
de Souza (10) Patent No.: US 6,447,582 B1
(45) Date of Patent: Sep. 10, 2002

(54) ADSORPTION UNIT WITH PRESSURE MODULATION

(75) Inventor: Guillaume de Souza, Issy-les-Moulineaux (FR)

(73) Assignee: L'Air Liquide, Societe Anonyme a Directoire et Conseil de Surveillance pour l'Etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 09/616,932

(22) Filed: Jul. 14, 2000

(30) Foreign Application Priority Data

Jul. 16, 1999 (FR) .............................. 99 09251

(51) Int. Cl.[7] ........................................ B01D 53/047
(52) U.S. Cl. .................................... 96/121; 96/130
(58) Field of Search .................... 96/114, 121, 122, 96/130, 131, 133; 95/96, 97, 98, 103

(56) References Cited

U.S. PATENT DOCUMENTS

| | | | | |
|---|---|---|---|---|
| 3,564,816 A | * | 2/1971 | Batta | |
| 4,360,362 A | * | 11/1982 | Asztalos | |
| 4,475,929 A | * | 10/1984 | Fuderer | ............ 95/97 |
| 4,522,637 A | * | 6/1985 | Becker | |
| 4,693,730 A | * | 9/1987 | Miller et al. | ............ 95/96 |
| 4,834,780 A | * | 5/1989 | Benkmann | |
| 4,857,083 A | * | 8/1989 | DiMartino | ............ 95/103 |
| 5,112,590 A | * | 5/1992 | Krishnamurthy et al. | ...... 96/130 |
| 5,620,504 A | * | 4/1997 | Coates | ............ 96/114 |
| 6,224,651 B1 | * | 5/2001 | Monereau et al. | ............ 95/19 |

FOREIGN PATENT DOCUMENTS

| | | |
|---|---|---|
| EP | 0 022 603 A1 | 1/1981 |
| EP | 0 513 747 A1 | 11/1992 |
| FR | 2 769 851 | 4/1999 |

* cited by examiner

Primary Examiner—David A. Simmons
Assistant Examiner—Frank M. Lawrence
(74) Attorney, Agent, or Firm—Young & Thompson (57) ABSTRACT

This PSA unit is of the type comprising 2N adsorbers (N≧2) whose production outlets can be connected by gas circulation lines. The adsorbers are coupled in the form of pairs of adsorbers ($A_1$–$A_4$, $A_2$–$A_5$, $A_3$–$A_6$); the outlets of the adsorbers of each pair are connected by a direct line ($L_{14}$, $L_{25}$, $L_{36}$) provided with two first valves (i3, (N+i)3); and an intermediate point ($B_1$, $B_2$, $B_3$) of the direct line located between the two first valves is connected to a transverse line (2) common to all the pairs by a connection valve (12, 22, 32).

11 Claims, 11 Drawing Sheets

ADSORPTION UNIT WITH PRESSURE MODULATION

FIELD OF THE INVENTION

The present invention relates to an adsorption unit with pressure modulation (Pressure Swing Adsorption or PSA), of the type comprising 2N adsorbers (N≧2) each having a production outlet. It is applicable particularly to the production of hydrogen, methane or CO by PSA adsorption.

BACKGROUND OF THE INVENTION

The PSA cycles comprise successively, for each adsorber: a production phase by adsorption; a regeneration phase of the adsorbent comprising at least one step of co-current depressurization with pressure balancing with another adsorber, a step of final counter-current depressurization with evacuation of residual gas, and generally an elution step at the low pressure of the cycle; and a repressurization phase comprising at least one pressure balancing step with another adsorber, and a final repressurization step by means of production gas.

In what follows, there will be meant by "inlet" and "outlet" of an adsorber, the inlet of the gas to be treated and the outlet of the product gas during the step of production of the PSA cycle, by "co-current" the direction of circulation of the inlet toward the outlet, and by "counter-current" the reverse direction of circulation. Moreover, the pressures indicated are absolute pressures.

In conventional PSA units of the mentioned type, there is provided for each step of the cycle (production, pressure balancing between adsorbers, counter-current depressurization, elution, final repressurization) a transverse line common to all the adsorbers, which can be connected individually to the outlet of each adsorber by means of a corresponding valve.

Correspondingly, when the unit comprises a large number of adsorbers, as is often the case in hydrogen production installations, each adsorber is associated with as many valves as there are transverse lines. This leads to an extremely complex and costly tubing, both from the point of view of capital cost and from that of maintenance or size.

The invention has for its object considerably to simplify the tubing of the PSA unit.

SUMMARY OF THE INVENTION

To this end, the invention has for its object a PSA adsorption unit of the mentioned type, characterized in that:
  the adsorbers are coupled in the form of adsorber pairs;
  the outlets of the adsorbers of each pair are connected by a direct line provided with two first valves; and
  an intermediate point of the direct line located between the two first valves is connected to a transverse line common to all the pairs by means of a connection valve.

The PSA adsorption unit according to the invention can comprise one or several of the following characteristics, taken alone or in their various possible technical combinations:
  the adsorbers being numbered in their order of passage to the production phase in the course of each cycle, the adsorber couples are $A_1$–$A_{N+1}$, $A_2$–$A_{N+2}$, . . . , $A_i$–$A_{N+i}$, . . . , $A_N$–$A_{2N}$,
  at least two of said intermediate points are connected by a connection line provided with a second connection valve,
  the two first valves are control valves whilst the connection valves are open-shut valves,
  said intermediate point is moreover connected to the common transverse line by a supplemental connection line provided with a supplemental connection valve which is a control valve,
  the unit moreover comprises at least one additional transverse line connected individually to the outlet of each adsorber via a control valve,
  at least one additional transverse line can be subdivided, by manipulating an additional valve, into two transverse half-lines each connected to N adsorbers,
  at least one additional transverse line is subdivided into two transverse half-lines, of which each is connected to N adsorbers,
  the adsorbers contain at least one adsorbent adapted to the production of hydrogen, methane or CO, typically active carbon and/or zeolite and/or activated alumina.

BRIEF DESCRIPTION OF THE DRAWINGS

Examples of embodiment of the invention will now be described with respect to the accompanying schematic drawings, in which.

DETAILED DESCRIPTION OF THE INVENTION

Figure 1:
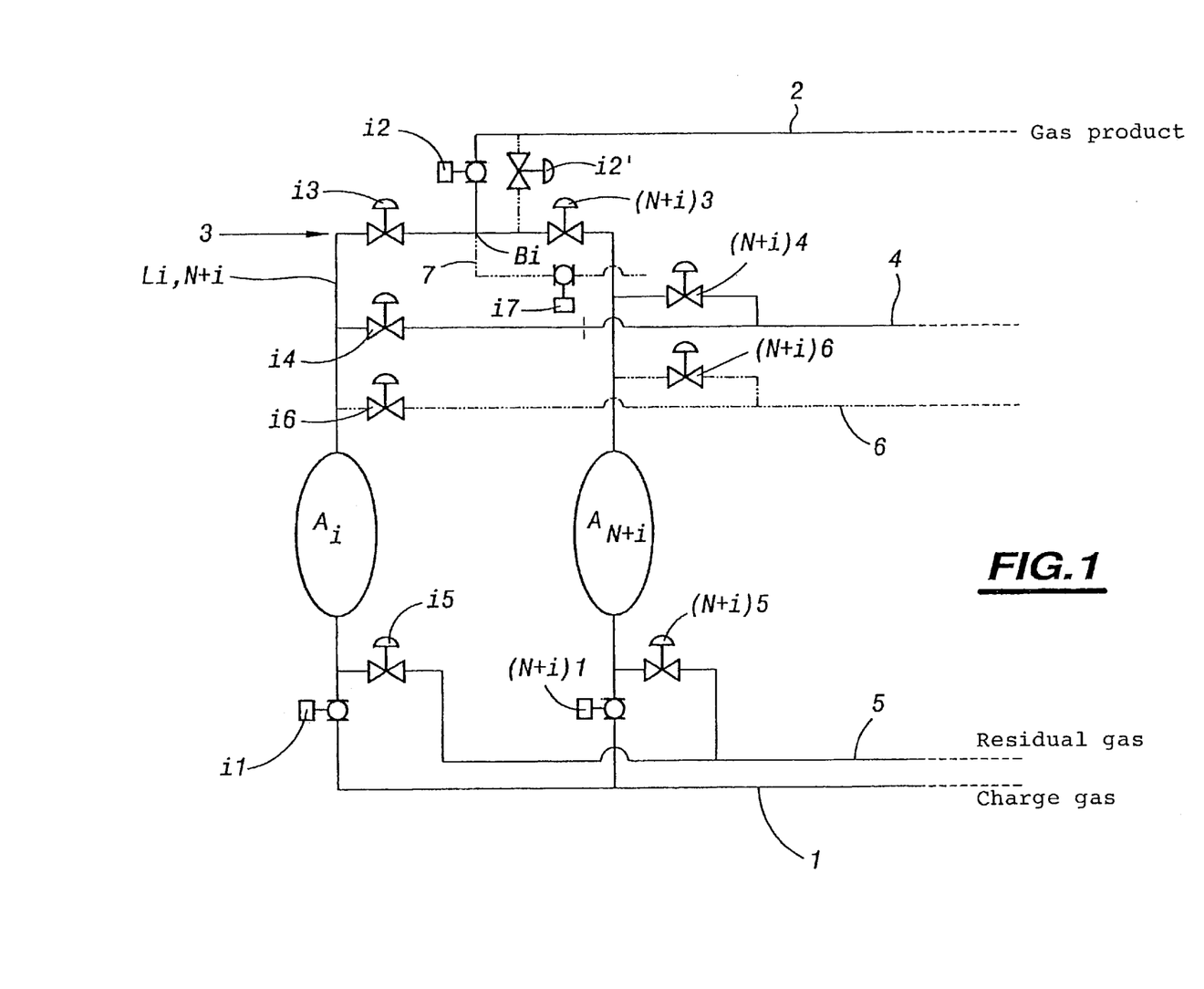
FIG. 1 shows a pair of adsorbers of a PSA unit according to the invention.

There is shown in FIG. 1 the couple of adsorbers of index i of a unit for the production of hydrogen by PSA, having two N adsorbers. These adsorbers being numbered 1 to 2N in the order of their entering the production phase, the two adsorbers of the couple i are the adsorbers $A_i$ and $A_{N+i}$ for reasons which will become apparent later.

The PSA cycle comprises for example a production step, pressure balancing steps between adsorbers, a counter-current depressurization step, an elution step and a final repressurization step with product gas. To ensure transfers of gas in the course of these different steps, there is provided:
  a transverse line 1 for supply of charge gas, individually connected to the input of each adsorber $A_x$ via a valve TOR (all or nothing) designated x1;
  a transverse line 2 for purified hydrogen production;
  for each couple $A_i$–$A_{N+i}$, a direct line $L_{i,N+i}$ (typically a single direct line for each pair) dedicated to at least one step of the cycle in the course of which the outlets of the two adsorbers of the couple are to be connected, this direct line connecting the outlets of the two adsorbers of the couple. The line $L_{i,N+i}$ is provided with two control valves i3 and (N+i)3. The transverse line 2 is connected to a point $B_i$ of the line $L_{i,N+i}$ located between these two valves, via a valve TOR i2: if desired, as shown in broken line, a control valve i2' can be mounted in parallel with the terminals of the valve i2;

another transverse line 4, dedicated to at least one other balancing/elution step of the cycle. This line is individually connected to the outlet of each adsorber $A_x$ via a control valve designated x4;

a transverse line 5 for evacuation of residual gas, individually connected to the inlet of each adsorber x, via a control valve designated x5.

As shown in broken line, other transverse lines 6, individually connected to the outlet of each adsorber $A_x$ via a control valve x6 in the same manner as line 4, can be provided as a supplement for more complicated PSA cycles.

Moreover, also as shown in broken line, a connection conduit 7 provided with a valve TOR i7 can connect the points $B_i$ of at least two direct lines.

As a modification, the transverse lines can be individually connected to the adsorbers by valves TOR and be provided each with a control valve.

Figure 2:
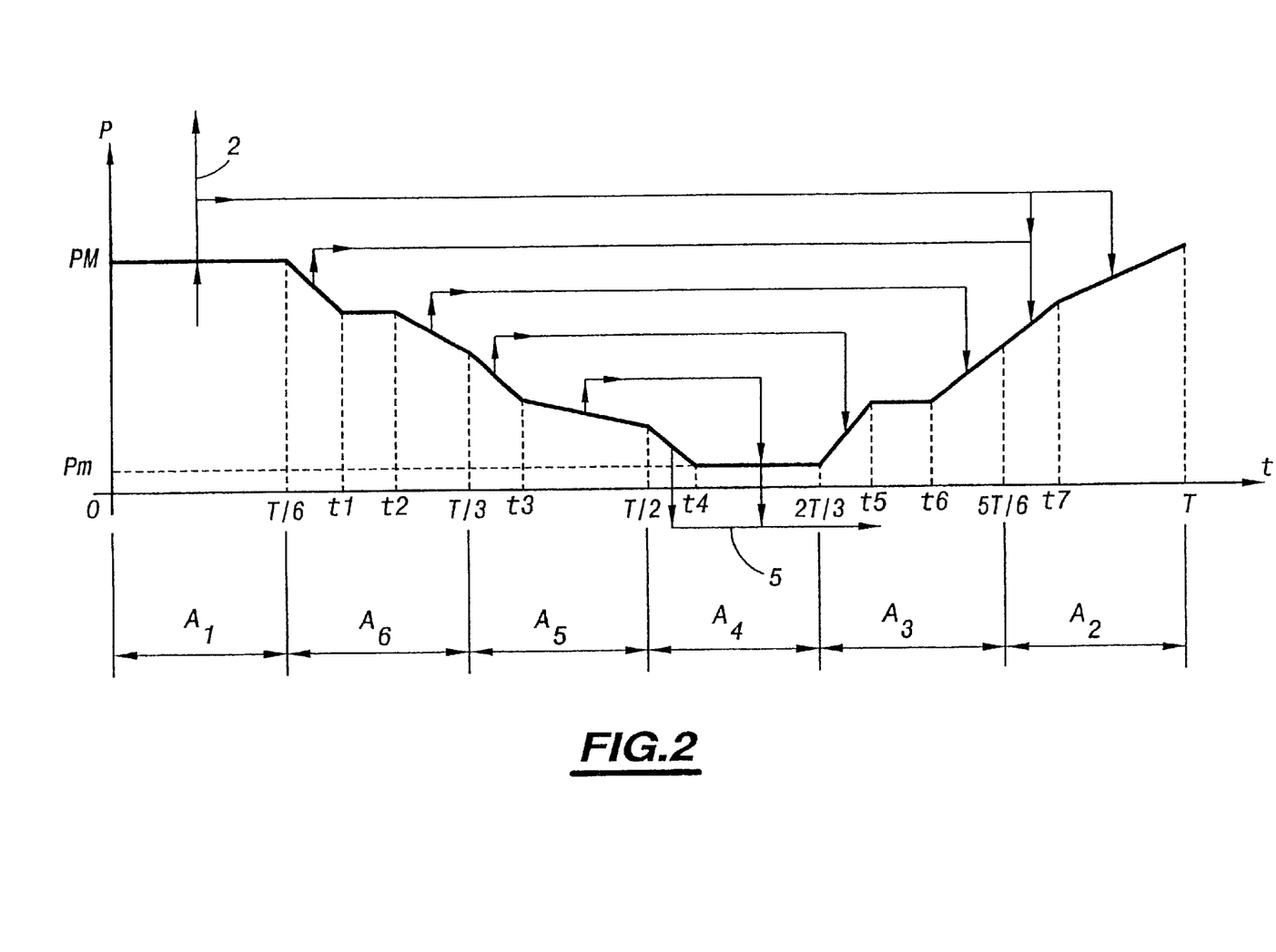
FIG. 2 is a diagram which illustrates an operating cycle of a PSA unit according to the invention with six adsorbers.
Figure 3:
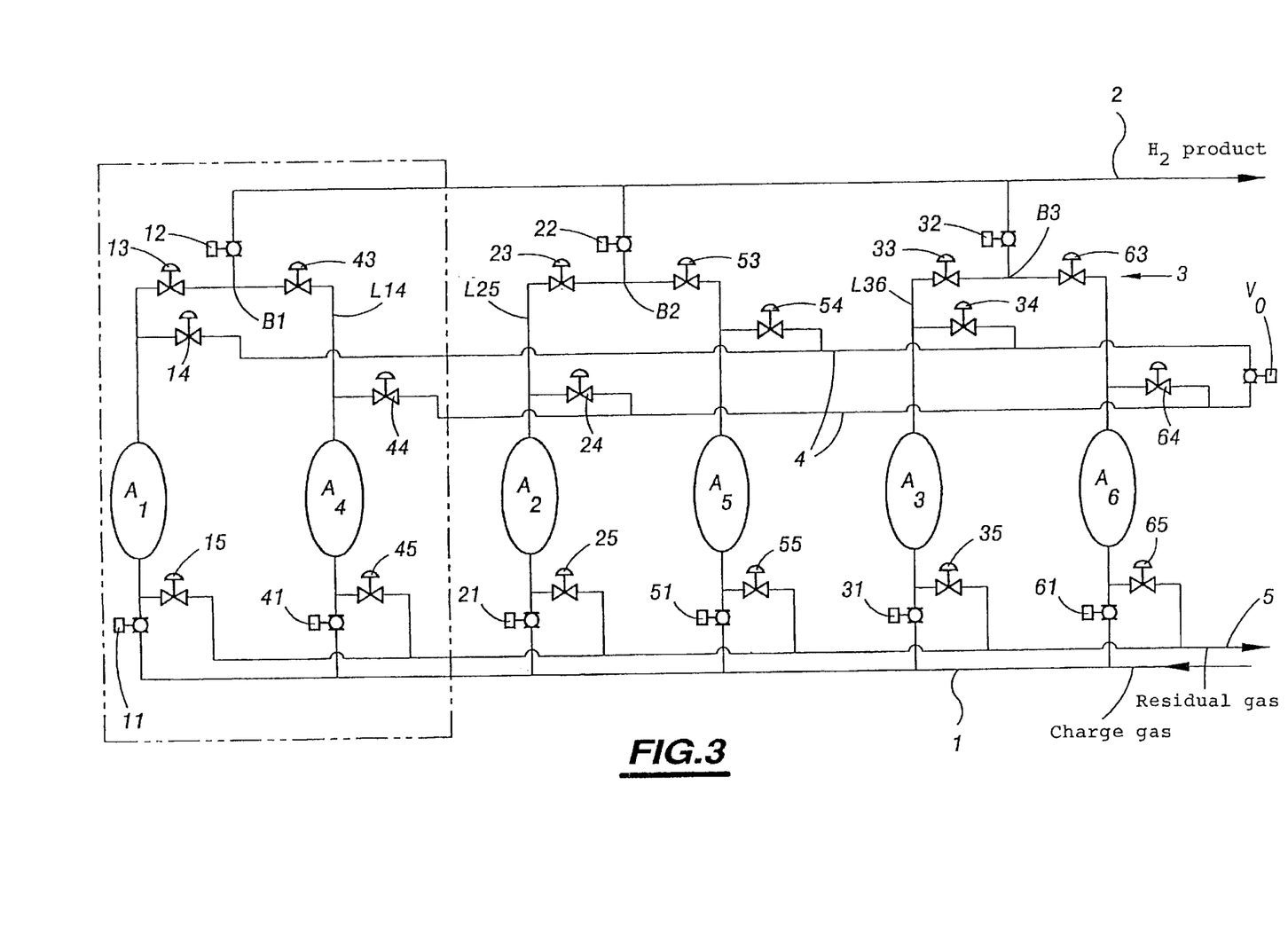
FIG. 3 shows a corresponding PSA unit.

FIGS. 2 and 3 show the application of the invention to a cycle with six adsorbers having one adsorber at a time in production and three in pressure balance.

The unit using six adsorbers (FIG. 3) corresponds exactly to the diagram of FIG. 1, with three adsorber couples $A_1$–$A_4$, $A_2$–$A_5$ and $A_3$–$A_6$. There is neither a valve i2', nor a supplemental transverse line 6, nor a connection line 7. However, the line 4 can be subdivided into two half-lines by a valve TOR $V_0$.

Moreover, the installation comprises means, known per se, and not shown, for control, regulation and electrical supply and supply of fluid refrigerant, adapted to carry out the cycle shown in FIG. 2.

In FIG. 2, in which the time t is shown on the abscissa and the absolute pressure P on the ordinate, the lines whose directions are shown by arrows indicate the movements and destinations of the gas currents and, moreover, the direction of circulation of the adsorber: when an arrow is in the direction of the increasing ordinate (upward in the diagram), the current is said to be co-current in the adsorber. If the arrow directed upwardly is located below the line indicating the pressure in the adsorber, the current enters the adsorber by the inlet end of the adsorber; if the arrow, directed upwardly, is located above the line indicating the pressure, the current leaves the adsorber by the outlet end of the adsorber; when an arrow is in the direction decreasing along the ordinate (downwardly in the diagram), the current is said to be counter-current in the adsorber. If the arrow directed downwardly is located below the line indicating the pressure of the adsorber, the current leaves the adsorber by the inlet end of the adsorber; if the arrow directed downwardly is located above the line indicating the pressure, the current enters the adsorber by the outlet end of the adsorber.

The cycle of FIG. 2, whose period T is, by way of example 6×180 s, comprises the following successive steps for a given adsorber, for example the adsorber $A_1$. This cycle is offset by a phase time T/6 from one adsorber to the next. The time and pressure scales have not been accurately given, for clarity of the drawing. The durations and pressures indicated are purely way of indication.

(1) From t=0 to T/6=180 s: Production substantially isobaric at the high pressure PM of the cycle, which is typically comprised between about 10 and 50 bars and particularly about 25 bars.

(2) From T/6 to t1: First co-current depressurization by pressure balancing with another adsorber in the course of counter-current repressurization. The duration of these two concomitant steps is 30 s.

(3) From t1 to t2: The adsorber is isolated (duration: 70 s).

(4) From t2 to T/3: Second co-current depressurization by pressure balancing with a counter-adsorber in the course of counter-current repressurization. The duration of these two concomitant steps is 80 s.

(5) From T/3 to t3: Third co-current depressurization by pressure balancing with another adsorber in the course of counter-current repressurization, the duration of these two concomitant steps is 50 s.

(6) From t3 to T/2: Fourth co-current depressurization. The gas from the outlet of the adsorber is sent to another adsorber in the course of elution. The duration of these two concomitant steps is 130 s.

(7) From T/2 to t4: Final counter-current depressurization to the low pressure Pm of the cycle, about atmospheric pressure. The gas from the inlet of the adsorber is sent to the line 5 and evacuated as residual gas. The duration of this step is 50 s.

(8) From t4 to 2T/3: Counter-current elution, at the low pressure Pm. The elution gas from another adsorber in step (6) described above is introduced at the outlet of the adsorber, and residual gas is withdrawn at its inlet and evacuated in the line 5.

(9) From 2T/3 to t5: First counter-current repressurization by pressure balancing with another adsorber in step (5) described above.

(10) From t5 to t6: The adsorber is isolated (duration: 50 s).

(11) From t6 to 5T/6: Second counter-current repressurization by pressure balancing with another adsorber in step (4) described above.

(12) From 5T/6 to t7: Third counter-current repressurization by pressure balancing with another adsorber in step (2) described above. Simultaneously, the adsorber receives counter-current production gas from another adsorber in the production state.

(13) From t7 to T: Final counter-current repressurization to the high pressure PM of the cycle, by means of production gas removed in the line 2. The duration of this step is 150 s.

It will be noted that removal of production gas during all the production step permits maintaining a constant production flow.

During the first phase time (t=0 to T/6), the adsorber $A_1$ is in production. At the time T/6, it is the adsorber $A_2$ which is repressurized to the high pressure PM, such that it is the adsorber $A_2$ which enters into production. It is followed, at time T/3, by the adsorber $A_3$, at time T/2 by the adsorber $A_4$, at time 2T/3 by the adsorber $A_5$ and at time 5T/6 by the adsorber $A_6$. It will thus be understood that, on the diagram of FIG. 2, each phase time shows the pressure variation in one of six adsorbers, which is indicated below the axis of the abscissa ($A_1$, $A_6$, $A_5$, $A_4$, $A_3$, $A_2$ in the order of the six phase times).

Figure 2A:
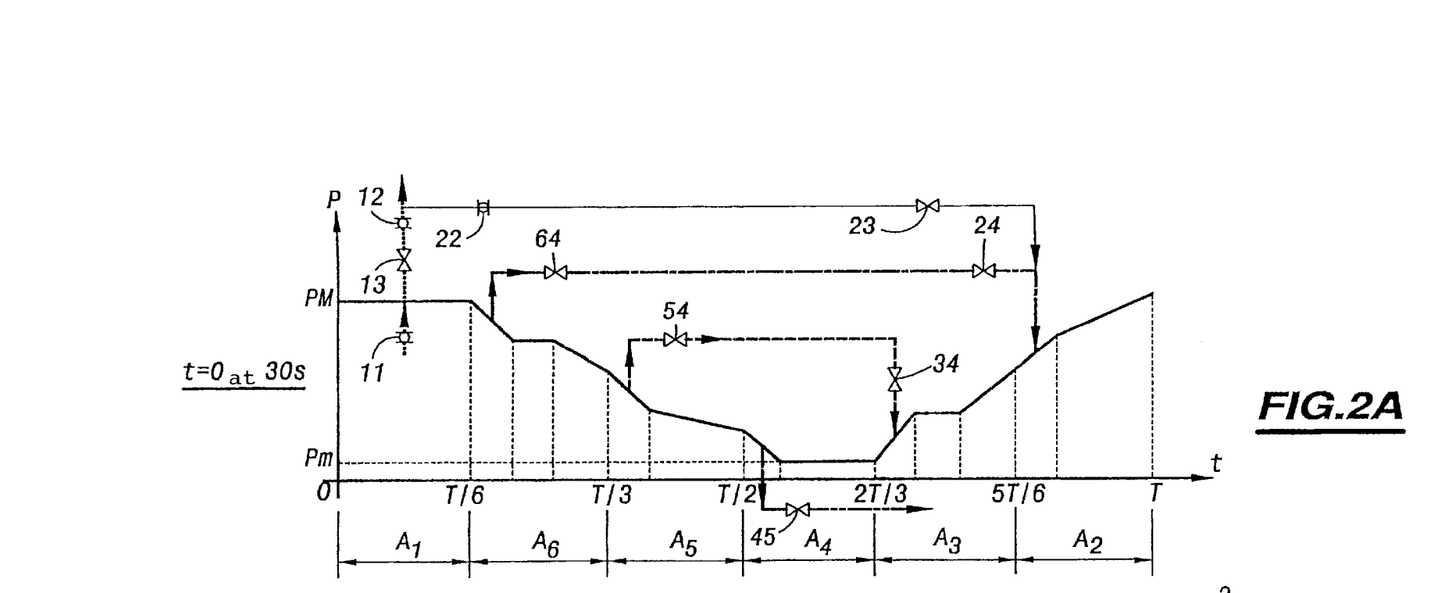
FIGS. 2A to 2D are diagrams analogous to FIG. 2 which show four subdivisions of the cycle.
Figure 2B:
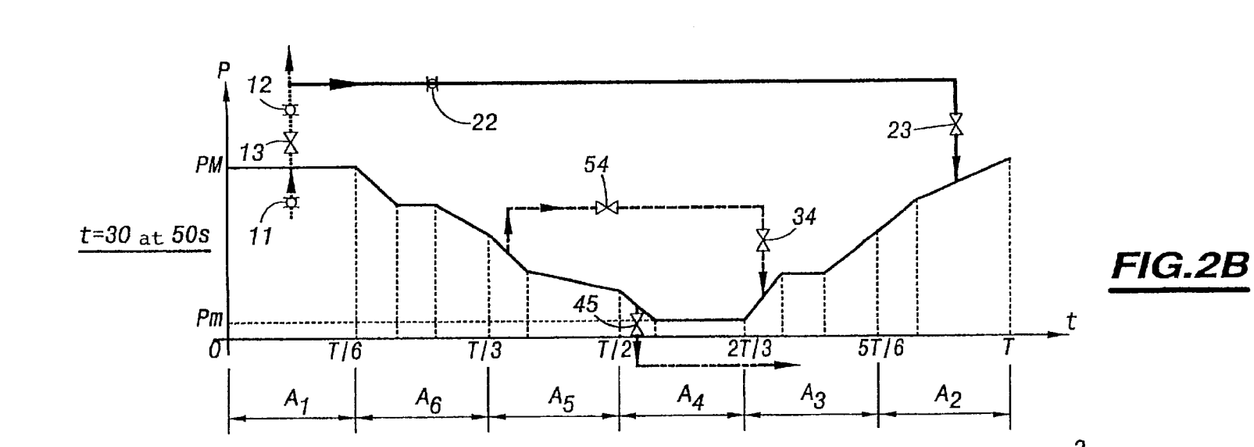
Figure 2C:
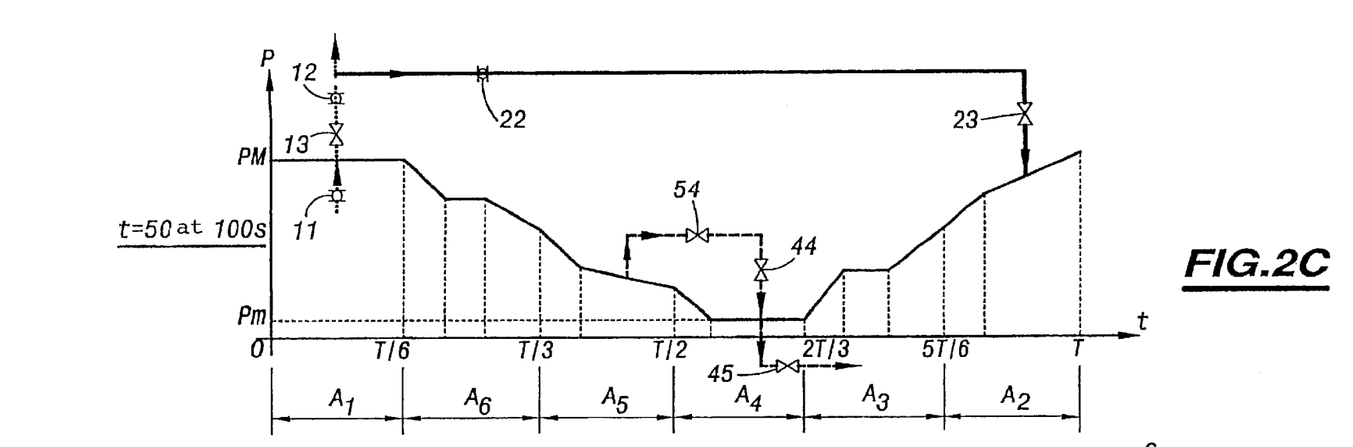
Figure 2D:
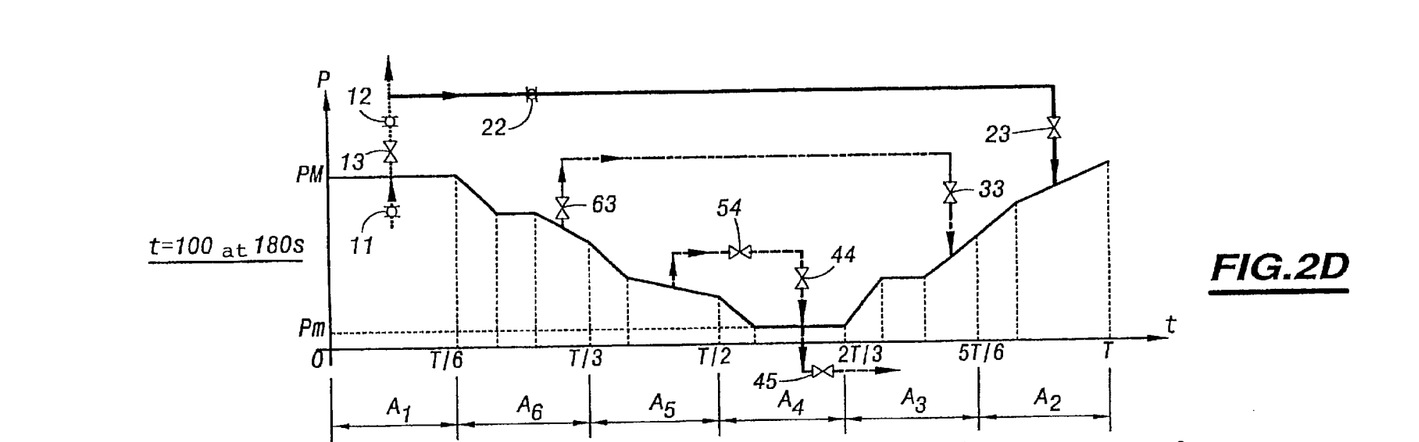
Figure 3A:
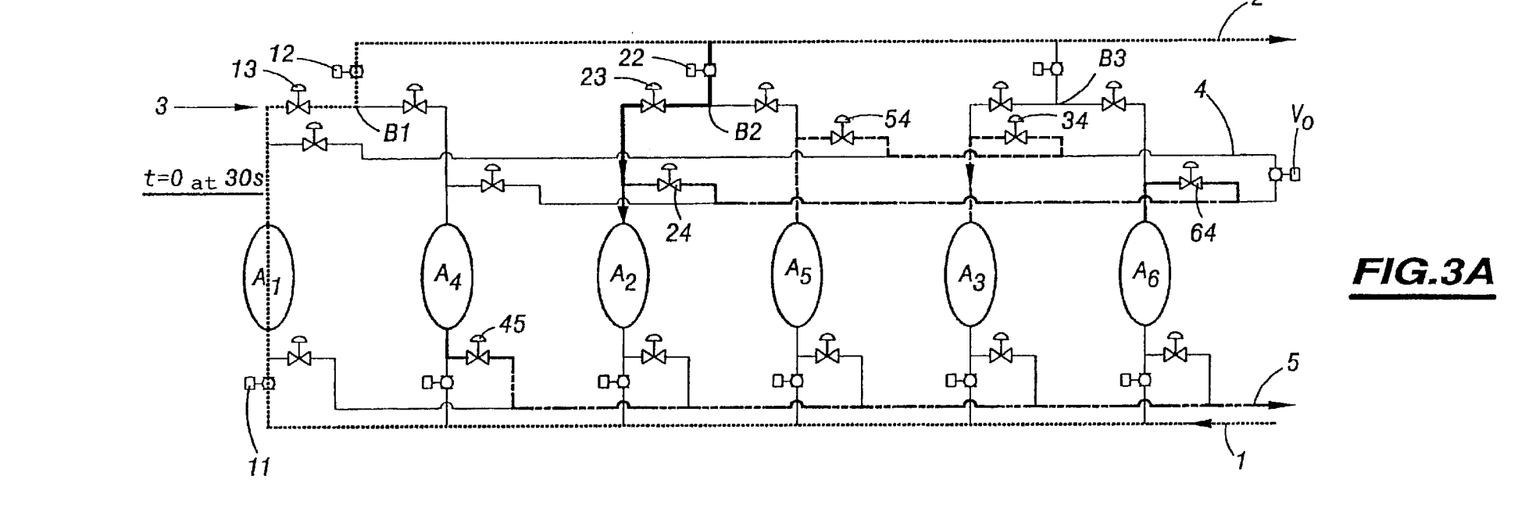
FIGS. 3A to 3D show the condition of the valves of the adsorption unit in each of these four subdivisions of the cycle.
Figure 3B:
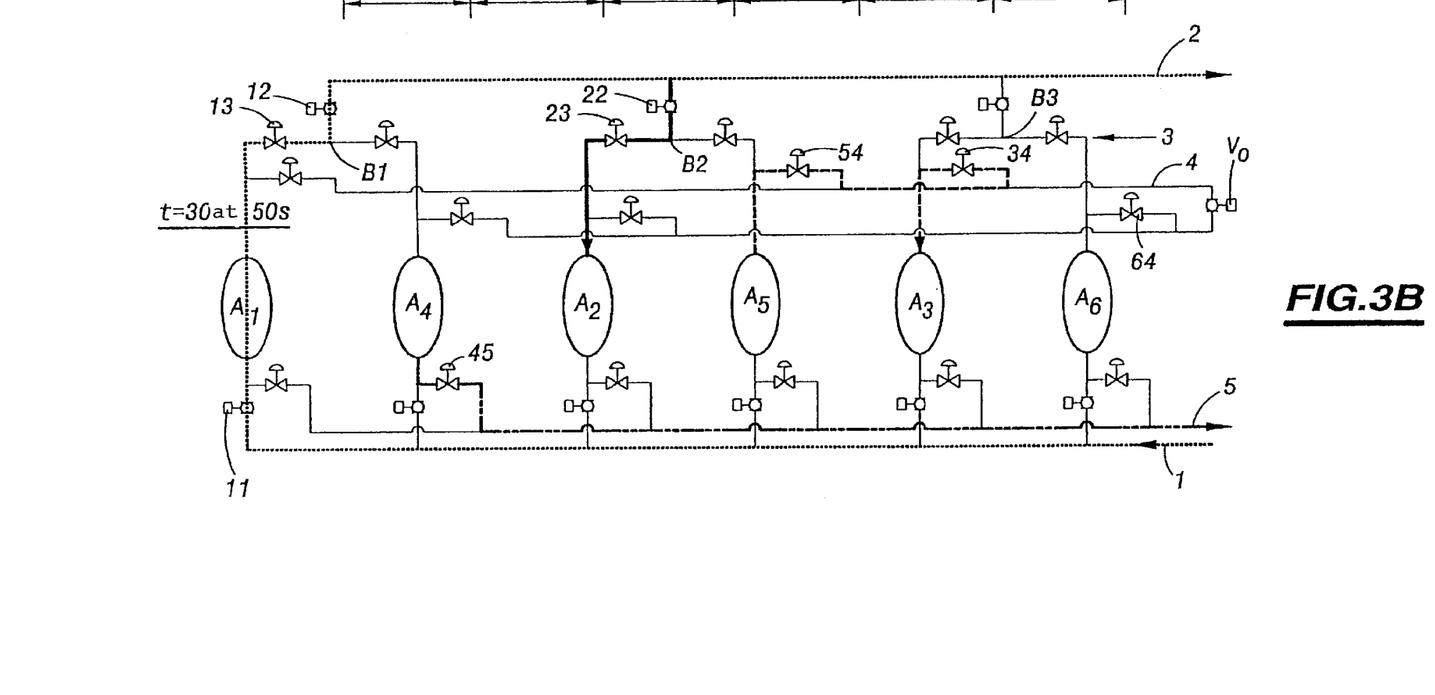
Figure 3C:
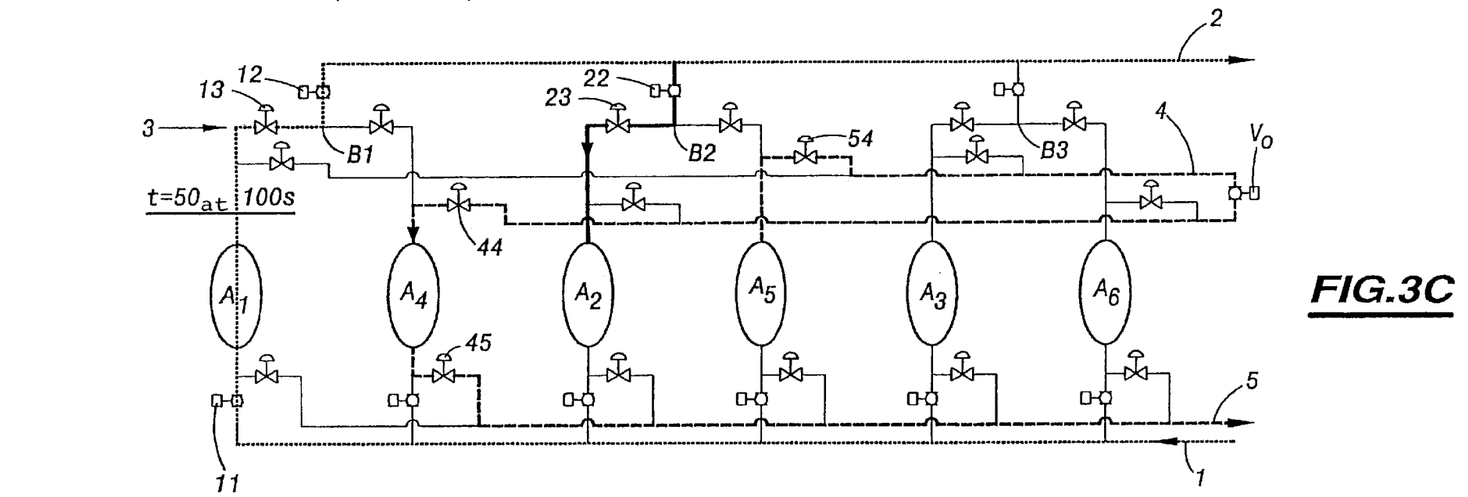
Figure 3D:
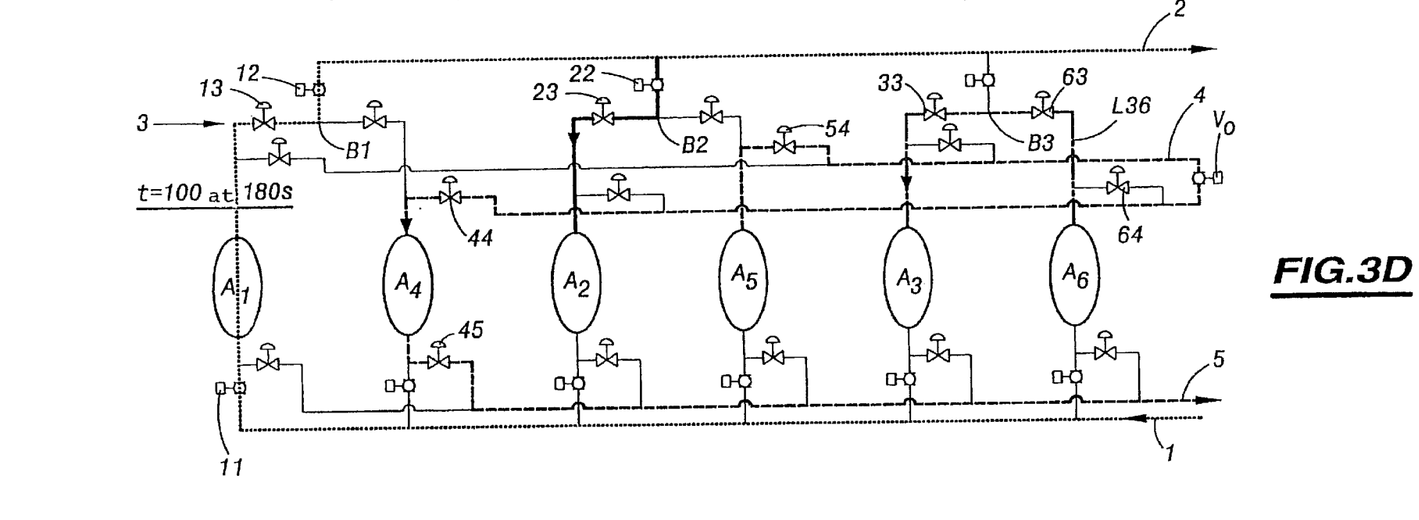

Given the symmetry of the connections between adsorbers during the pressure balancing and elution steps, the phase times can thus be broken down into four periods which will now be described with respect to FIG. 2A–3A to 2D–3D. On FIGS. 2A to 2D, there are shown only the open valves, and only these have been referenced in FIGS. 3A to 3D, in addition to the valve $V_0$.

t=0 to 30 s (FIGS. 2A and 3A):

The adsorber $A_1$ is in production (valves 11, 13 and 12). Adsorber $A_2$ is in repressurization (valves 22 and 23) so as to maintain a constant production flow. Valve $V_0$ is closed, which permits carrying out in line 4 two different balancings: $A_2$–$A_6$ on the one hand (valves 24 and 64), $A_3$–$A_5$ on the other hand (valves 34 and 54). The adsorber $A_4$ is in final depressurization (valve 45).

t=30 s to 50 s (FIGS. 2B and 3B):

The adsorber $A_1$ is in production (valves 11, 13 and 12). The adsorber $A_2$ is in final repressurization (valves 22 and 23). Valve $V_0$ remains closed, and the adsorbers $A_3$ and $A_5$ remain connected together to carry out the third pressure balancing (valves 34 and 54). Adsorber $A_4$ is undergoing its final depressurization (valve 45). Adsorber $A_6$ is isolated.

t=50 s to 100 s (FIGS. 2C and 3C):

Adsorber $A_1$ is in production (valves 11, 13 and 12). Adsorber $A_2$ is in final repressurization (valves 22 and 23). Valve $V_0$ is open, and adsorbers $A_4$ and $A_5$ are connected together (valves 44 and 54). Adsorber $A_4$ is in elution, valve 45 is open.

t=100 to 180 s (FIGS. 2D and 3D):

Adsorber $A_1$ is in production (valves 11, 13 and 12). Adsorber $A_2$ is in final repressurization (valves 22 and 23). The adsorbers $A_3$ and $A_6$ are connected together by their direct line $L_{36}$. Valve $V_0$ is open, and the adsorbers $A_4$ and $A_5$ are connected together (valves 44 and 54).

Thanks to the connection arrangement described above, with its three direct lines $L_{14}$, $L_{25}$ and $L_{36}$, and the subdivision of the transverse line 4 by means of the valve $V_0$, the number of valves per adsorber and the total number of valves are greatly reduced, as are the inactive valves in the lines.

Thus, the unit of FIG. 3 comprises 18 control valves and 10 TOR valves, as compared to 19 and 18 respectively for the conventional arrangement for performing the same cycle. This conventional arrangement comprises thus six transverse lines connected individually to each adsorber, and a control valve for the final repressurization flow. The reduction of the total number of valves is thus 1−(37/28)= 32%. To this economy must be added corresponding gains in simplified tubing comprising fewer elbows, welds, etc., and decrease in the number of junction boxes and inlets/outlets of the automated control. The reliability is also improved in a corresponding manner.

It is to be noted that the steps which correspond to the use of a direct line $L_{i, N+i}$ are located at points in the cycle where there is the greatest number of simultaneous steps. This permits, thanks to the subdivision of a transverse line, simultaneously using several direct lines (FIG. 3D) and eliminating a transverse line.

Figure 4:
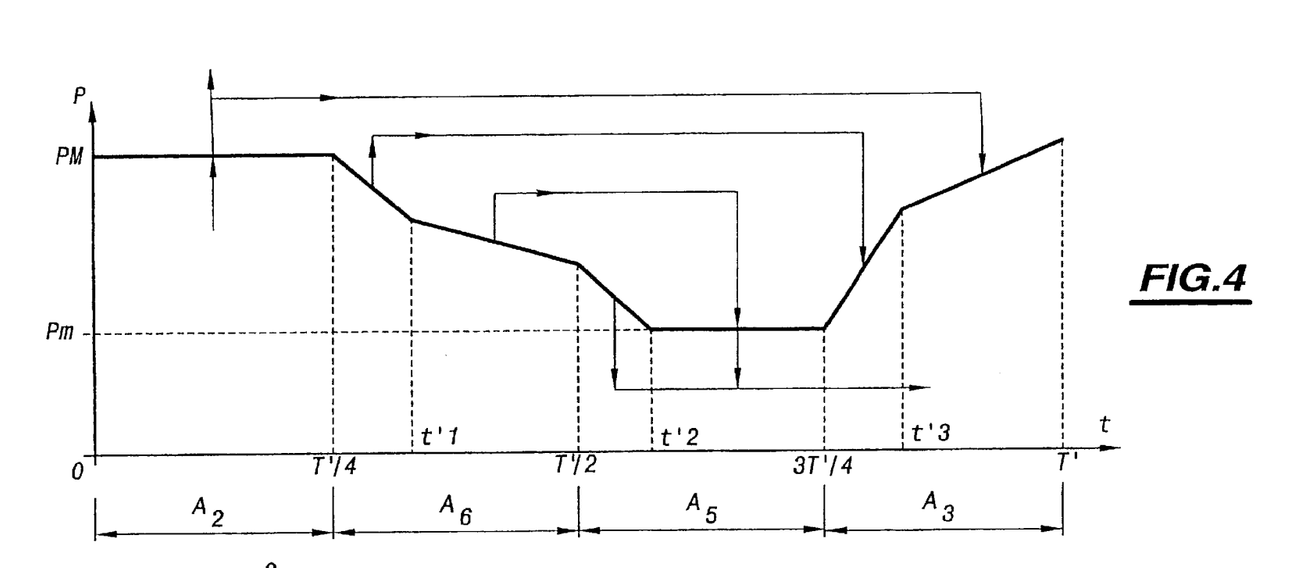
FIG. 4 is a diagram analogous to FIG. 2 which shows an exceptional operation of the unit.

In the case of an accident in one of the adsorbers, the corresponding couple of adsorbers can be isolated, as shown schematically in broken line in FIG. 3 for the adsorbers $A_1$ and $A_4$. The unit can then continue to operate with the four other adsorbers, with a cycle having one adsorber in production per phase time and a single balancing. Such a cycle of unusual operation is shown in FIG. 4 and comprises successively, for a period T', for the adsorber $A_2$ for example:

From t=0 to T'/4: Production phase.

From T'/4 to T'1: First co-current depressurization, by pressure balancing with another adsorber at the beginning of counter-current repressurization.

From t'1 to T'/2: Second co-current depressurization. The gas from the outlet of the adsorber is send counter-current into another adsorber in the elution phase.

From T'/2 to t'2: Final counter-current depressurization to the low pressure Pm of the cycle.

From t'2 to 3T'4: Elution at the low pressure Pm by means of gas from the second co-current depressurization of another adsorber.

From 3T'/4 to t'3: First counter-current repressurization by pressure balancing with another adsorber in the course of first co-current depressurization.

From t'3 to T': Final counter-current repressurization by means of production gas.

The direct line is used, in this cycle with four adsorbers, during the pressure balancing steps.

The manual cutoff valves which serve to carry out such an isolation are not shown in the drawings. However, it will be understood that, thanks to the presence of direct lines, the isolation of each couple of adsorbers requires one valve less than with a conventional arrangement.

Figure 6:
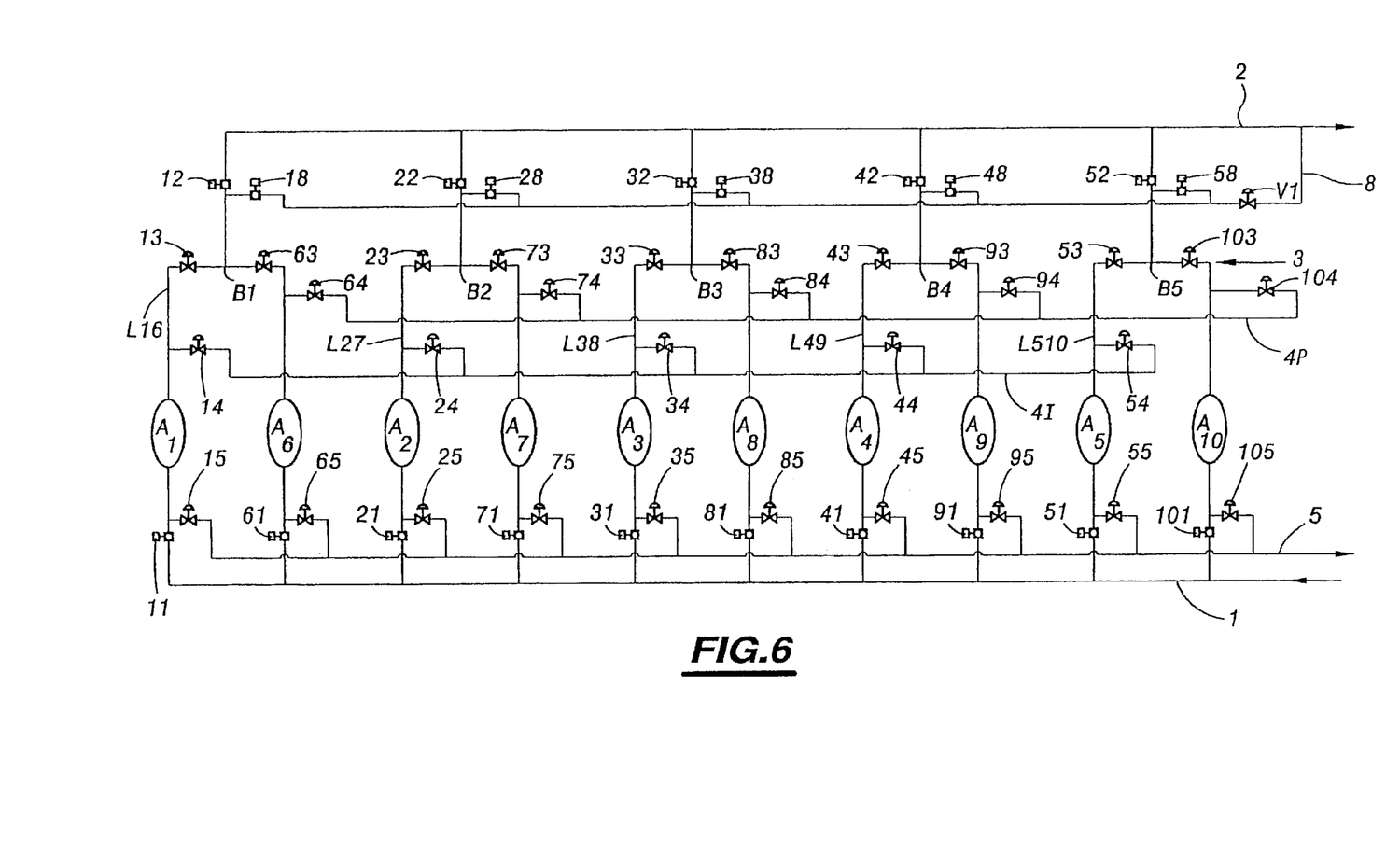
FIG. 6 shows this PSA unit with ten adsorbers.

The above considerations are applicable in the same manner to units with ten adsorbers, and more generally with (4x+2) adsorbers. Thus, FIG. 6 shows a unit with ten adsorbers $A_1$ to $A_{10}$, which use a cycle of three balancings in which three adsorbers are simultaneously in production in each time phase.

The arrangement of the unit is analogous to that of FIG. 3, with the direct lines $L_{i,5+1}$ connecting the adsorber couples $A_1$–$A_6$, $A_2$–$A_7$, $A_3$–$A_8$, $A_4$–$A_9$ and $A_5$–$A_{10}$. The transverse lines 1, 2 and 5 will be seen to be connected as above.

The valve $V_0$ has been omitted, and the transverse line 4 is subdivided into two independent transverse half-lines, namely a half-line 4P connected to all the even adsorbers and a half-line 4I connected to all the odd adsorbers. The final repressurization takes place via a supplemental transverse line 8 connected to the line 2, provided with a control valve $V_1$ and connected to the point $B_i$ of each direct line via a TOR valve 18, 28, 38, 48, 58 respectively.

Figure 5:
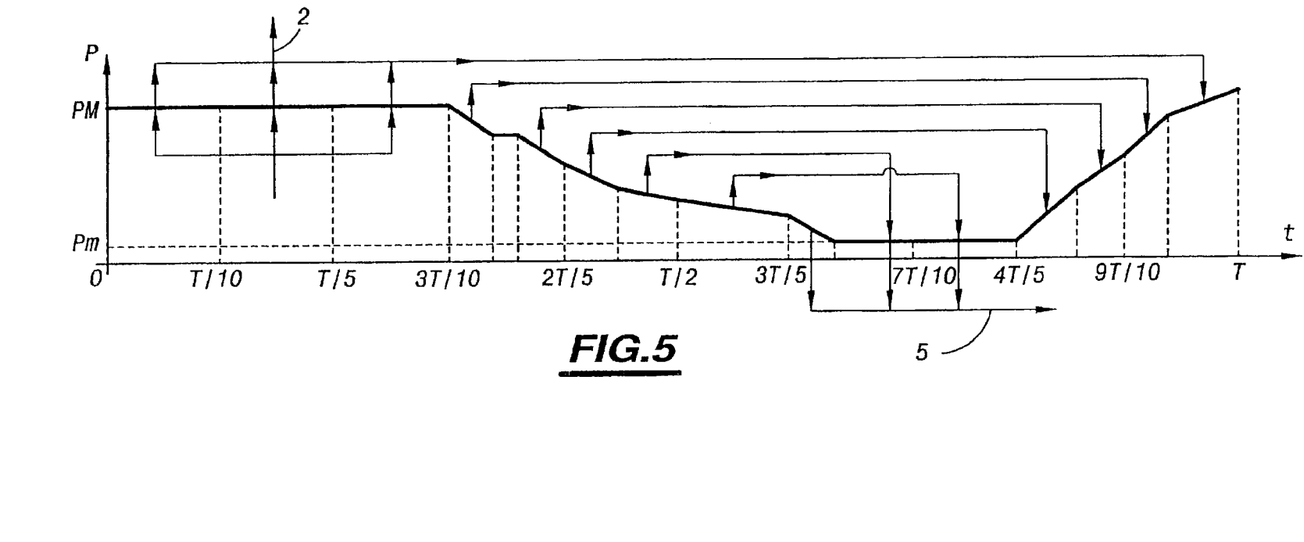
FIG. 5 is a diagram analogous to FIG. 2 but corresponding to a cycle of a PSA unit according to the invention with ten adsorbers.

The cycle shown in FIG. 5 differs from that of FIG. 2, essentially by the following points:

The adsorber remains in production for three phase times (from t=0 to 3T/10).

The adsorber remains in elution for a supplemental phase time (from 7T/10 to 4T/5), during which it receives counter-current gas issuing from another adsorber in the course of fifth co-current depressurization (from T/2 to 3T/5).

The period of isolation of the adsorber in the course of recompression is omitted.

In the case of such a unit with ten adsorbers, there are 31 control valves and 20 TOR valves, as compared to 32 and 30 respectively in the conventional arrangement. The reduction of the number of valves is thus 1−(62/51)=22%.

Figure 7:
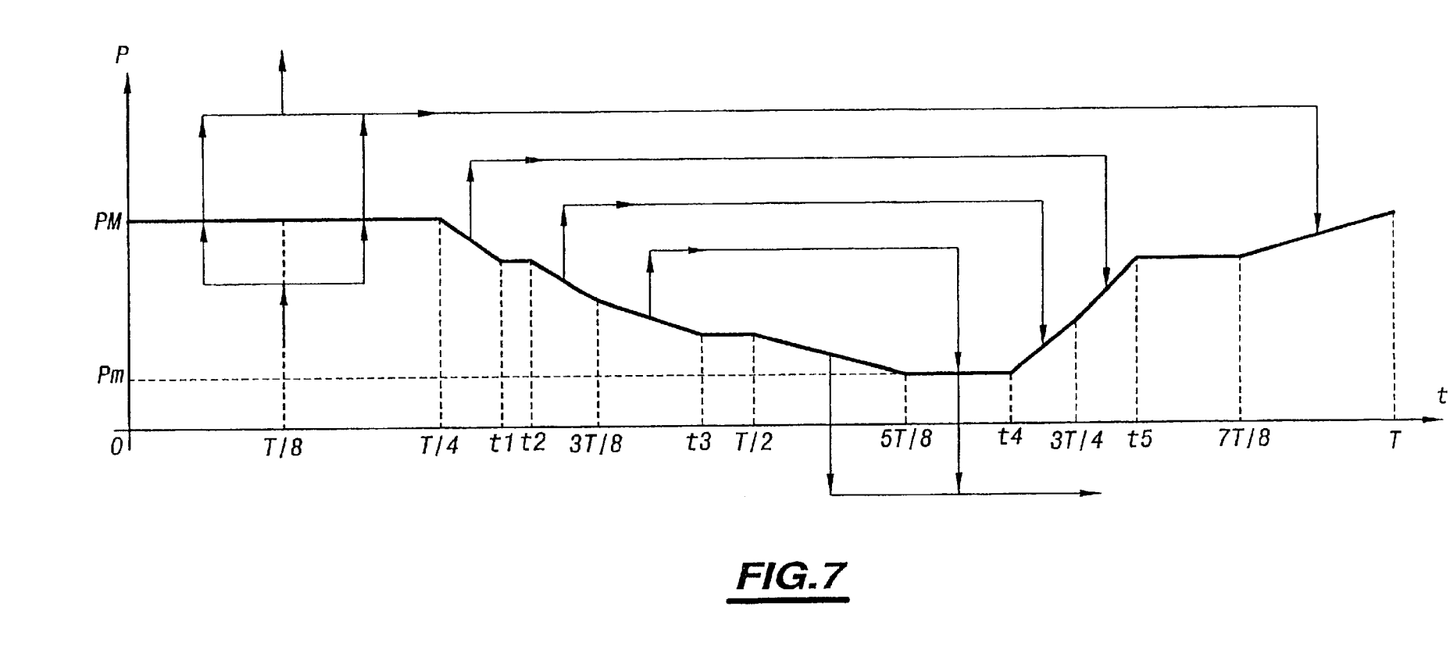
FIG. 7 is a diagram analogous to FIG. 2 but corresponding to a cycle of a PSA unit according to the invention with eight adsorbers.
Figure 8:
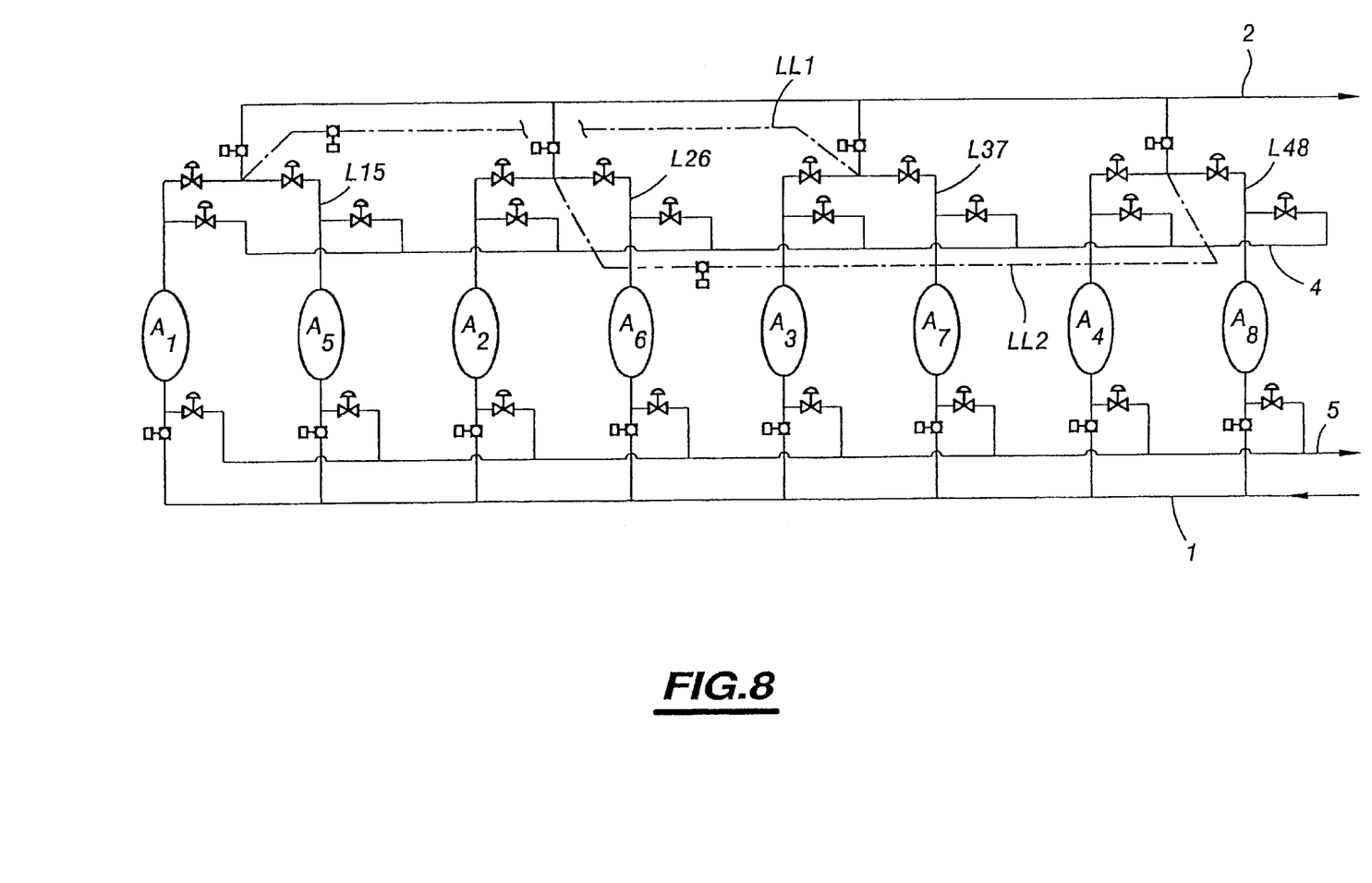
FIG. 8 shows this PSA unit with eight adsorbers.

FIGS. 7 and 8 show the application of the invention to a unit with eight adsorbers $A_1$ to $A_8$ using a cycle with two balancings during which two adsorbers are in produced for each time phase.

The arrangement of the unit (FIG. 8) is the same as that of FIG. 3, except that there are a pair of supplemental adsorbers and that the transverse line 4 is not subdivided, the valve $V_0$ being omitted. It will be noted that the adsorber couples $A_1$–$A_5$, $A_2$–$A_6$, $A_3$–$A_7$ and $A_4$–$A_8$ are in parity, which is not the case in the units with six adsorbers (FIG. 3) or with ten adsorbers (FIG. 7).

Such a unit comprises 24 control valves and 12 TOR valves, as opposed to 26 and 18 respectively in the conventional arrangement. The gain in valves is thus 1−(44/36)= 22%.

In such units with eight adsorbers, the number of valves can be further decreased in the manner indicated in broken line in FIG. 8; the line 4 is replaced by two connection lines LL1 and LL2 of which each, provided with one TOR valve, connects the direct lines of the same parity, by being connected to the points $B_i$ of these direct lines. There are thus replaced six control valves by two TOR valves.

Such a modification is applicable in the same manner to all units having 4x adsorbers.

The corresponding PSA cycle, shown in FIG. 7, comprises successively: a step of adsorption at the high pressure PM, from t=0 to T/4; from T/4 to $t_1$, a first co-current depressurization by pressure balancing with another adsorber in the course of counter-current repressurization; from $t_1$ to $t_2$, a dead time during which the adsorber is isolated; a second co-current depressurization by pressure balancing with another adsorber in the course of counter-current repressurization, this step ending at 3T/8; from 3T/8 to $t_3$, a third co-current decompression in which the gas from the outlet of the adsorber is transferred to another adsorber in the course of counter-current elution; a second dead time, which ends at T/2, in the course of which the adsorber is isolated; a final counter-current depressurization to the time 5T/8; from 5T/8 to $t_4$, a counter-current elution step at the low pressure Pm by means of gas from another adsorber in the course of a third co-current depressurization; a first counter-current repressurization by pressure balancing with another adsorber in the case of second co-current depressurization, this step ending at 3T/4; from 3T/4 to $t_5$, a second counter-current repressurization by pressure balancing with another adsorber in first co-current depressurization; a third dead time in the course of which the adsorber is isolated, this dead time ending at 7T/8; and a final counter-current repressurization by means of production gas.

It will be recalled that all the connection valves ($i_i$) described above are valves that take part in the cycle and differ because of this from the shut off, manual or pneumatic valves that can be provided moreover for maintenance operations. Thus, although the invention has been described in relation to particular embodiments for the separation of particular gaseous mixtures, it is not thereby limited but is subject to modifications and variations which will be apparent to one skilled in the art within the scope of the following claims.

What is claimed is:

1. Pressure swing adsorption unit comprising 2N adsorbers (N≧2) each having a production outlet, wherein:

the adsorbers are coupled by pairs of adsorbers in each adsorber pair, the outlets of the adsorbers are interconnected by a direct line provided with two first valves; and an intermediate point of the direct line located between the two first valves is connected to a transverse line common to all the pairs via a line portion including an all or nothing connection valve.

2. The pressure swing adsorption unit of claim 1, wherein the two first valves are control valves.

3. The pressure swing adsorption unit of claim 1, comprising a single direct line for each adsorber pair.

4. The pressure swing adsorption unit according to claim 1, wherein the adsorbers are numbered in their order of passage into production phase in the course of each cycle, the couples of adsorbers being $A_1$–$A_{N+1}$, $A_2$–$A_{N+2}$, . . . , $A_i$–$A_{N+i}$, . . . , $A_N$–$A_{2N}$.

5. The pressure swing adsorption unit according to claim 1, wherein at least two of said intermediate points are connected by a connection line provided with a second all or nothing connection valve.

6. The pressure swing adsorption unit according to claim 1, wherein said intermediate point is moreover connected to the common transverse line by a supplemental connection line provided with a supplemental connection valve which is a control valve.

7. The pressure swing adsorption unit according to claim 1, further comprising at least one additional transverse line connected individually to the outlet of each adsorber via a control valve.

8. The pressure swing adsorption unit according to claim 7, wherein said at least one additional transverse line is structured and arranged to be subdivided, by manipulation of an additional valve, into two transverse half-lines connected to the adsorbers.

9. The pressure swing adsorption unit according to claim 7, wherein said at least one additional transverse line is subdivided into two transverse half-lines, each of which being connected to N adsorbers.

10. The pressure swing adsorption unit according to claim 1, wherein N≧3.

11. The pressure swing adsorption unit according to claim 1, wherein the adsorbers contain at least one adsorbent adapted for the production of hydrogen, methane or CO.

\* \* \* \* \*